US008831161B2

(12) United States Patent
Whitby-Strevens et al.

(10) Patent No.: US 8,831,161 B2
(45) Date of Patent: Sep. 9, 2014

(54) METHODS AND APPARATUS FOR LOW POWER AUDIO VISUAL INTERFACE INTEROPERABILITY

(75) Inventors: Colin Whitby-Strevens, Ben Lomond, CA (US); Moon Kim, Palo Alto, CA (US); Brijesh Tripathi, Cupertino, CA (US); Geertjan Joordens, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 13/223,214

(22) Filed: Aug. 31, 2011

(65) Prior Publication Data
US 2013/0050216 A1    Feb. 28, 2013

(51) Int. Cl.
*H04L 7/00*      (2006.01)
*H04L 25/00*     (2006.01)
*H04L 25/40*     (2006.01)
*G06T 17/00*     (2006.01)
*G06F 13/14*     (2006.01)
*H04L 12/28*     (2006.01)

(52) U.S. Cl.
CPC ............. *G06F 13/14* (2013.01); *Y02B 60/1228* (2013.01); *H04L 12/281* (2013.01); *Y02B 60/1235* (2013.01)
USPC ............................ 375/371; 345/428; 345/519

(58) Field of Classification Search
CPC    Y02B 60/1228; Y02B 60/1235; G06F 13/14; H04L 12/281
USPC .................. 710/8, 10, 16, 104, 106; 375/371; 345/428, 519
See application file for complete search history.

(56) References Cited

U.S. PATENT DOCUMENTS

| 6,040,723 | A  | * | 3/2000  | Sato ............................... 327/144 |
| 6,564,269 | B1 | * | 5/2003  | Martin ............................ 710/20 |
| 7,730,343 | B2 | * | 6/2010  | Bayus et al. ................... 714/4.2 |
| 8,224,885 | B1 | * | 7/2012  | Doucette et al. .............. 709/201 |
| 2002/0157030 | A1 | * | 10/2002 | Barker et al. ................. 713/320 |
| 2004/0213170 | A1 | * | 10/2004 | Bremer ......................... 370/282 |
| 2007/0053293 | A1 | * | 3/2007  | McDonald et al. ........... 370/235 |
| 2007/0258453 | A1 | * | 11/2007 | Kobayashi ..................... 370/389 |
| 2008/0001480 | A1 | * | 1/2008  | Ooi et al. ......................... 307/85 |
| 2010/0183004 | A1 | * | 7/2010  | Kobayashi ..................... 370/389 |
| 2011/0117854 | A1 | * | 5/2011  | Ruelke et al. ................. 455/63.1 |

OTHER PUBLICATIONS

"VESA DisplayPort Standard", Version 1, Revision 1a, Jan. 11, 2008.*
DisplayPort: the next generation interface for high-definition video and audio content, TA0339 Technical Article, Jun. 23, 2010.*

* cited by examiner

*Primary Examiner* — Farley Abad
(74) *Attorney, Agent, or Firm* — Meyertons, Hood, Kivlin, Kowert & Goetzel, P.C.

(57) ABSTRACT

Methods and apparatus for adjusting the operation of a display device so as to be at least within prescribed form factor or other constraints. In one embodiment of the invention, various operational parameters for a display element are adjusted based on considerations specific to high density form factor constraints. For example, in one such device, a Low Power DisplayPort (LPDP) device having a LPDP source and sink adjust the data rate of the visual data to minimize power consumption while still properly supporting display panel resolutions. In some embodiments, the LPDP source and sink may adjust the transceiver voltages to minimize power consumption. In an alternate embodiment, an LPDP device adjusts data rates to minimize the effects of platform noise. In another aspect of the invention, various display elements of a device coordinate quiescent ("quiet") mode operation during periods of inactivity.

18 Claims, 6 Drawing Sheets

METHODS AND APPARATUS FOR LOW POWER AUDIO VISUAL INTERFACE INTEROPERABILITY

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of computerized devices and user interfaces. More particularly, in one exemplary aspect, the present invention is directed to embedded interface operation, such as for example with respect to Low Power DisplayPort™ (LPDP) implementations.

2. Description of Related Technology

Presentation of audio and visual elements has a direct impact on customer satisfaction. For example, many multimedia devices are widely judged (and purchased) according to qualities such as display quality, sound fidelity, smooth rendering, crispness of the display, lack of motion artifact or "jerkiness", etc. Other areas of multimedia applications which affect consumers include interoperation (e.g., with other equipment, legacy standards, etc.), ease of use, cost, power consumption, etc.

To these ends, audio/visual (A/V) interface technologies have evolved from simple display logic circuits into complex systems capable of, inter alia, platform-independent operation, networked operation, "plug and play" connection, etc. Moreover, current display interface technologies support seamless legacy display operation i.e., newer functionality is layered over existing legacy protocols. For example, secondary data may be transmitted during time intervals which are otherwise ignored or not utilized by legacy devices.

DisplayPort™ is one example of a display interface technology referred to above. It is specified by the Video Electronics Standards Association (VESA). Current incarnations of the DisplayPort standard specify support for simple networking of digital audio/visual (A/V) interconnects, intended to be used primarily between an arbitrary assembly of multimedia "sources" (e.g., computers or CPUs) and "sinks" (e.g., display monitors or other video rendering devices, home-theater systems, etc.).

Extant DisplayPort technology is an extensible digital interface solution that is designed for a wide variety of performance requirements, and broadly supports inter alia, PCs, monitors, panels, projectors, and high definition (HD) content applications. Current DisplayPort technology is also capable of supporting both internal (e.g., chip-to-chip), and external (e.g., box-to-box) digital display connections. Examples of internal chip-to-chip applications include notebook PCs, which drive a display panel from a graphics controller, or display components from display controllers driving the monitor of a television. Examples of box-to-box applications include display connections between PCs and monitors, and projectors (i.e., not housed within the same physical device). Consolidation of internal and external signaling methods enables the "direct drive" of digital monitors. Direct drive eliminates the need for control circuits, and allows for among other things, less costly and reduced profile (e.g., slimmer or smaller form factor) display devices.

However, while extant DisplayPort technology is well suited for a wide range of applications, changing consumer preferences have also driven research into specialized variants. Specifically, consumer electronic tastes have evolved to value compact form factors, power efficient and/or simple design, over more complicated, versatile, bulky implementations. There is accordingly a need to reassess existing solutions for adaptation to new consumer preferences such as the aforementioned more compact and simplified configurations. New technology to support these configuration changes is also therefore needed.

SUMMARY OF THE INVENTION

The present invention satisfies the aforementioned needs by providing improved apparatus and methods for embedded interface operation.

In a first aspect, a method for adjusting operation of at least a first component and second component according to one or more prescribed constraints is disclosed. In one embodiment, the one or more prescribed constraints are one or more high density form factor constraints, and the method includes: negotiating one or more component capabilities between the first and second component; exchanging at least one parameter between the first and second component, causing a corresponding adjustment to operation; and adjusting operation of the first and second components.

In one variant, the first component includes a Low Power DisplayPort (LPDP) source and the second component includes a Low Power DisplayPort sink.

In another variant, the one or more component capabilities includes a series of data rates. In one such variant, the series of data rates is based at least in part on a minimum data rate necessary to support a display resolution. Alternately, the series of data rates is based at least in part on a platform noise consideration. For example, the platform noise consideration includes reducing emitted electromagnetic interference (EMI) of the operation of the first and second components. In another such example, the platform noise consideration includes minimizing the effect of electromagnetic interference (EMI) emitted by at least one neighboring component.

In yet a third variant, the one or more component capabilities includes a series of transceiver voltages.

In a second aspect, an infra-device component configured to adjust operation according to one or more prescribed constraints is disclosed. In one embodiment, the infra-device component, includes: a first interface, the first interface configured for communication with a second component, wherein the second device is of at least a first or second component type; a second interface, the second interface configured for communication with the second component; a processor; and a computer readable apparatus having a storage medium with at least one computer program stored thereon, the at least one computer program configured to, when executed on the processor: negotiate one or more component capabilities with the second component via the second interface; exchange at least one parameter with the second component, the exchange thereby enabling a corresponding adjustment to operation of the second component; and adjust operation of the first interface.

In one variant, the second component includes a Low Power DisplayPort (LPDP) source, and the one or more prescribed constraints include high density form factor related constraints.

In another such variant, the second component includes a Low Power DisplayPort (LPDP) sink.

In still another such variant, the one or more component capabilities includes a series of data rates.

In yet another variant, the one or more component capabilities includes a series of transceiver voltages.

In still another variant, the one or more component capabilities includes operation without a link training procedure.

In a third aspect, a method for halting operation of a data bus between a first component and a second component is disclosed. In one embodiment, the method includes: signaling a cessation of operation to the second component; terminating a primary link between the first and second component; signaling a resumption of operation to the second component; resuming the primary link; and transmitting data via the primary link.

In a first variant, the first component includes a Low Power DisplayPort (LPDP) source, and the second component includes a Low Power DisplayPort sink.

In a second variant, the second component includes a visual display element.

In yet other implementations, the primary link has an active mode and an inactive mode, and the act of terminating includes placing the primary link into the inactive mode.

In still other incarnations, the inactive mode includes a vertical blanking interval.

In one such variant, the resuming the primary link includes achieving a clock data recovery lock and a symbol lock.

In a fourth aspect, a method for conditional link initialization is disclosed. In one embodiment, the method includes: negotiating one or more component capabilities between the first and second component; exchanging at least one parameter between the first and second component, causing a corresponding adjustment to operation; and wherein the adjustment to operation includes disabling link initialization.

In a fifth aspect of the invention, a computer readable apparatus is disclosed. In one embodiment, the apparatus includes a computer readable storage medium having at least one computer program stored thereon. The at least one program is configured to, when executed, negotiate one or more component capabilities between the first and second component; exchange at least one parameter between the first and second component, and cause a corresponding adjustment to operation.

In a sixth aspect of the invention, an audio/visual system is disclosed. In one embodiment, the system comprises a high density form factor device, comprising: a first processing element, a second processing element, and a display element, wherein the first and second processing elements are configured to provide visual data to the display element. In one such variant, the display element comprises a Liquid Crystal Display (LCD) and backlight. In another such variant the first and second processing elements comprise Low Power DisplayPort (LPDP) source and sink respectively. In still another embodiment, the second element is directly mounted to the glass of the display element.

Other features and advantages of the present invention will immediately be recognized by persons of ordinary skill in the art with reference to the attached drawings and detailed description of exemplary embodiments as given below.

Figure 1:
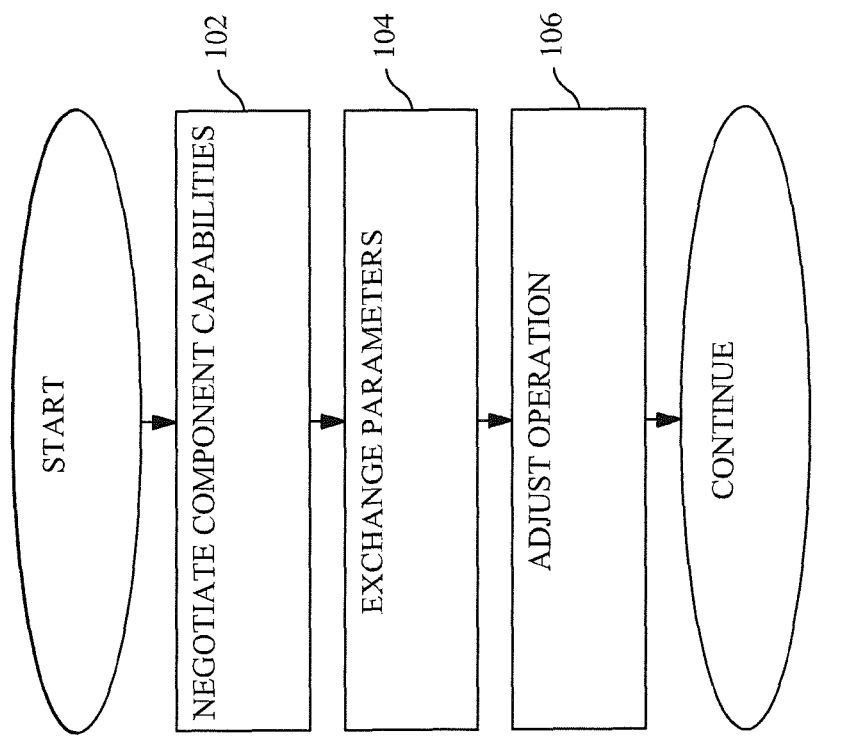
FIG. 1 is a logical flow diagram illustrating one embodiment of a method for adjusting operation of at least a first component and second component according to prescribed (e.g., high density form factor) constraints.

All Figures © Copyright 2011 Apple Inc. All rights reserved.

DETAILED DESCRIPTION OF THE INVENTION

Reference is now made to the drawings, wherein like numerals refer to like parts throughout.

Overview

Various aspects of the present invention address, inter alia, adaptation of device operation in order to support changing consumer tastes. Specifically, in one exemplary embodiment, new solutions for visual display element operation enable compact form factors, power efficiency, and/or more simple designs.

In one aspect of the invention, various operational parameters for a display element (e.g., display device such as a monitor or touch screen display) are adjusted based on considerations specific to one or more high density form factor constraints. As described in greater detail hereinafter, an exemplary Low Power DisplayPort (LPDP) device having LPDP source and LPDP sink components adjusts certain parameters to enable support of high density form factor designs. Common considerations in such high density form factor designs include e.g., efficient power consumption, reduced electromagnetic interference, and mechanical layout considerations (e.g., number of pins), etc.

In one exemplary embodiment, the data rate of the visual data being sent to the display or rendering device is adjusted to minimize power consumption, while still properly rendering media files according to display resolution requirements. Specifically, multiple fixed data rate options are provided, where the availability of finer granularity of data rates allows for the minimization of the amount of extraneous "dummy" data necessary to transmit a media file. Moreover, in one such variant, the finer granularity of data rates includes existing legacy data rates, thereby advantageously enabling legacy interoperation.

In an alternate embodiment, the data rate of the visual data is adjusted according to one or more platform noise considerations. Within high density form factor design, high clock rates and/or data rates can create significant electromagnetic interference (EMI), and/or be susceptible to significant interference from neighboring elements. While these EMI interference issues are difficult to predict, they are generally specific to a limited range of frequencies, etc. Accordingly, selecting a data rate outside of an affected frequency band can mitigate many such EMI issues, without having to necessarily understand the source thereof.

In a second aspect of the invention, various display elements of a device coordinate quiescent ("quiet") mode operation during periods of inactivity. In one exemplary embodiment, an LPDP source initiates quiescent ("quiet") mode operation during vertical blanking intervals. During quiet mode operation, the main link data transfers are inactive (the main link clock can be disabled thereby significantly reducing power consumption), while the auxiliary channel (AUX) remains active. Prior to resuming data transfer, the source can instruct the sink to wake up, such as via the AUX channel.

Other aspects and variations of the present invention are described in greater detail hereinafter.

DETAILED DESCRIPTION OF EXEMPLARY EMBODIMENTS

Exemplary embodiments of the present invention are now described in detail. While these embodiments are primarily discussed in the context of the Video Electronics Standards Association (VESA) DisplayPort (DP) audio/visual (A/V) bus protocol family of standards, it will be recognized by those of ordinary skill when given this disclosure that the present invention is not so limited. In fact, the various aspects of the invention are useful in literally any A/V bus protocol that can benefit from the various modifications and improvements described herein.

Additionally, the present invention is useful in any number of different types of devices including without limitation computers (desktops, towers, laptops, etc.), hand-held devices such as smart phones and MP3 players, digital readers or tablets, and navigation systems (hand-held and in-vehicle). For instance, exemplary consumer electronics products manufactured by the Assignee hereof that may benefit from one or more aspects of the invention include but are not limited to, the iPhone™, iPod™, iPad™, Macbook™, Macbook Pro™ Macbook Air™, etc.

Methods—

Referring now to FIG. 1, one embodiment of a generalized method for adjusting operation of at least a first component and second component according to one or more prescribed constraints is described.

At step 102 of the method 100, the first and second components (which might be, for example, components of the same computerized device, or of two different devices) negotiate one or more component capabilities. In one exemplary embodiment, the first and second components identify one another as compliant to a given interface standard. For example, the first and second components may identify one another as being DisplayPort-compliant and/or Low Power DisplayPort-compliant. Embodiments specific to the LPDP solution are described in greater detail subsequently herein (see Exemplary Low Power DisplayPort Operation). However, it is appreciated that aspects of the present invention are widely applicable to any embedded interface. Common examples of other embedded Audio Visual (A/V) interfaces include, but are not limited to: High Definition Multimedia Interface™ (HDMI), Digital Visual Interface™ (DVI), Video Graphics Array (VGA), Thunderbolt™, etc.

In the exemplary embodiment, the first and second components exchange one or more component capabilities subsequent to or as part of the aforementioned negotiation. For example, component capabilities may include, but are not limited to: (i) listings of component settings that are acceptable for use, (ii) listings of component settings that are unacceptable for use, (iii) parameters and/or algorithm input for determining one or more component settings, and so forth. Common examples of component settings include data rates, clock rates, resource usage, transceiver interface capabilities, supported power saving modes, etc. For instance, in one exemplary implementation of the method 100, the first and second component may exchange acceptable data rates. Common examples of parameters and/or algorithm input for determining component settings include optimization criteria, optimization algorithms, combinations of optimization algorithms, etc. For instance, the first and second component may negotiate parameters or algorithms to reduce power consumption, minimize platform noise, and/or minimize the effects of radiated noise.

In one exemplary embodiment, the first component and second component include a Low Power DisplayPort (LPDP) source and sink, respectively (or vice versa; note that the methodology described herein is not specific or restricted to any particular configuration or direction Alternatively, the first and second components include a LPDP source or sink, and a legacy DP sink or source. In one such variant, the first and second component exchange acceptable data rates, transceiver settings, and supported power modes. Furthermore, the source and/or sink may also specify an appropriate optimization algorithm, or set of algorithms.

In one exemplary LPDP-based implementation, the LPDP component identifies itself and its associated capabilities via a secondary auxiliary channel (AUX) link. During this step, the LPDP component determines if the connected component is another LPDP-compliant component, or a legacy DP (or non-LPDP) element. In some cases, additional revision or version information may also be exchanged so as to accurately determine configuration or resolve and capability ambiguities.

At step 104, at least one parameter is exchanged between the first and second component, thereby enabling (or even causing in some variants) a corresponding adjustment to operation. Various schemes for adjusting operation are described in greater detail hereinafter.

In one embodiment, the at least one parameter is exchanged prior to any data exchange. The exchanged parameter further enables or disables a component setting. For example, prior to initiating a data transfer over a data link connection, the first and second component may agree on a given data rate, transceiver setting, etc. based on e.g., minimizing power consumption and/or reducing overall platform noise.

In another example, the first and second component may agree on removing unnecessary or undesirable procedures from link initialization. In still other examples, the first and second component may agree on certain power saving modes (e.g., sleep modes, etc.).

Alternatively, the at least one parameter is exchanged during periods of inactivity. In one such implementation, the parameter enables power saving operation during periods of inactivity. Such power saving operations may include cessation of "dummy" data transfer, halting bus transactions, halting clock operations, shutting down portions of a processor (e.g., pipeline, memory regions, co-processors, etc.).

As still another alternative, the at least one parameter is dynamically exchanged during operation. For example, in one such implementation, the parameter includes information related to the first and/or the second component's monitored condition(s). Monitored conditions may include for example, consumed power, bit error rate (BER), block error rate (BLER), platform noise, display resolution requirements, etc. Such exchange may occur once during each operational connection or session, periodically (e.g., every X seconds), upon the occurrence of a prescribed event, or according to yet other schemes.

At step 106, the first and second components adjust operation. For example, in one embodiment, the first and second components adopt an agreed upon data rate. In other examples, the first and second component transceivers increase or decrease their data rate according to prescribed optimization algorithms shared by the components.

In other embodiments, the first and second components may agree to a particular transceiver setting for transmissions. Still other embodiments may agree to a set of power consumption schemes. Various other implementations will be made apparent to those of ordinary skill in the related arts, given the contents of the present disclosure.

Figure 2:
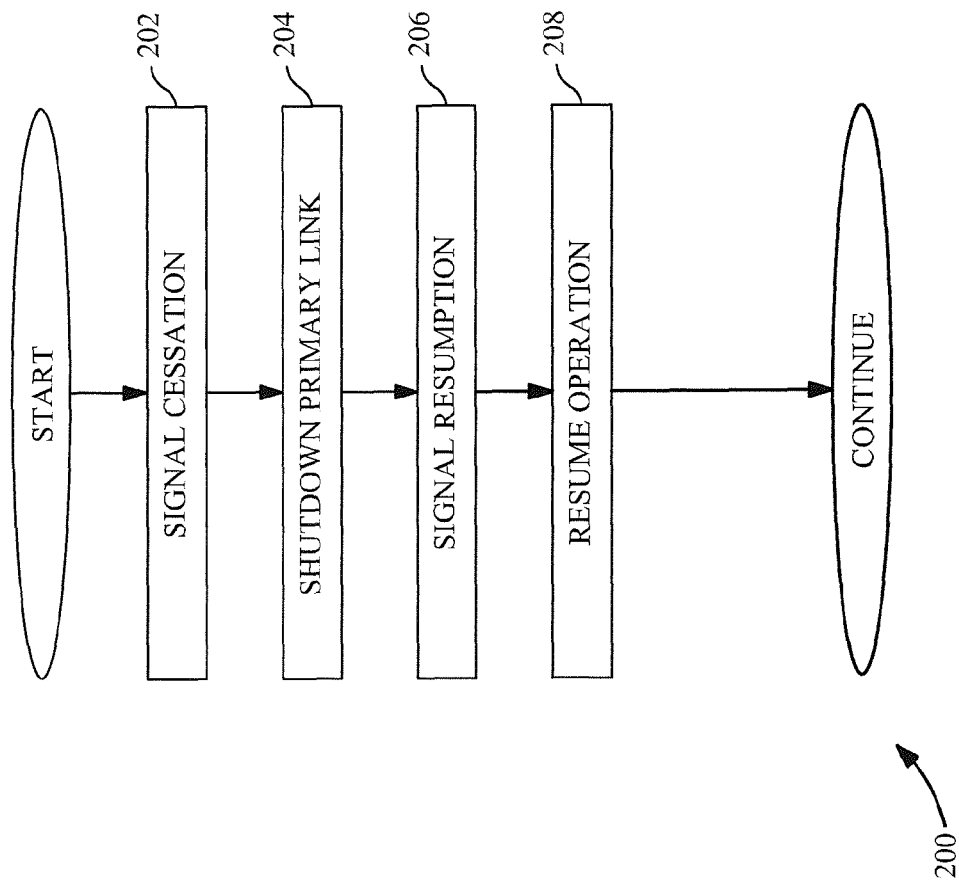
FIG. 2 is a logical flow diagram illustrating one embodiment of a method for halting operation of a data bus between a first component and a second component.

Referring now to FIG. 2, one embodiment of the method for halting operation of a data bus between a first component and a second component according to the invention is described. In one exemplary implementation of this method 200, the first component and second component are a LPDP source and LPDP sink, respectively, During normal operation, the LPDP source transmits data via a main link to a LPDP sink, whereas the control interface is handled via a secondary AUX channel. Embodiments specific to the LPDP solution are described in greater detail subsequently herein (see Exemplary Low Power DisplayPort Operation infra).

At step 202 of the method 200, the first component signals a cessation of operation (e.g., sleep mode, etc.) of a primary link to the second component. In one exemplary embodiment, the signaling occurs via a secondary link, where the secondary link does not cease operation (i.e., remains active) during inactivity of the primary link.

In alternate embodiments, the signaling to shut down the primary link occurs via the primary link (in such cases, an out-of-band communication or other such mechanism may be required to resume the link).

In still other embodiments, the signaling includes a predetermined scheme for link resumption; for example, in one such variant, the signaling includes schedule information, preconfigured trigger criteria, etc.

At step 204 of the method 200, the second component terminates a primary link. It is noted that in the present context, the term "terminate" may refer to anything ranging from a partial cessation of one or more operational capabilities of the link, to a complete shutdown or dormancy of the link, depending on the particular application and desired functionality.

In one exemplary embodiment, the primary link includes a data bus that is additionally adapted for use with clock data recovery (CDR) schemes. For such embodiments, disabling the data bus additionally disables clock synchronization between the first and second component (i.e., the CDR circuitry is disabled during quiet mode); consequently, any signaling occurring over a secondary link may additionally be configured to be resistant to clock drift. For instance, secondary link operation may be configured to use Manchester-type encoding. Manchester-type encoding encodes data within transitions (e.g., a high to low transition signifies a logic low ('0'), a low to high transition signifies a logic high ('1')). Transition type logic can be easily detected even during large clock drift, because the receiver can identify if it is misaligned by up to half a bit period (a transition is guaranteed for each bit, thus if no transition is detected the receiver is misaligned). Other forms of self clocking and self correcting codes include for example: 8B10B, Return to Zero (RZ), Non-Return to Zero (NRZ), NRZ inverted (NRZI), etc.

In some implementations, easily identified patterns are chosen to signal cessation and resumption of operation. For example, where a Manchester-type encoding is used, a sleep and wakeup signal may be implemented with a bit pattern that violates Manchester-type encoding. For example, in one such exemplary embodiment, a sleep indication may be signaled with a '0011LLHH0011', and a wakeup indication may be signaled with a '1100LLHH0011'. These codes are chosen arbitrarily, for simplicity and uniqueness. When the receiver receives a non-compliant symbol, the receiver interrupts the secondary link operation to wakeup (or put to sleep) the main link. It is appreciated that a myriad of other combinations of codes may be chosen, the foregoing being merely illustrative.

In some embodiments, the primary link includes a data bus that transmits data that has significant periods of activity and inactivity. In one such variant, the data includes at least (i) visual data and (ii) vertical blanking intervals.

At step 206, the first component signals a resumption of operation to the second component. In one exemplary embodiment, prior to the end of an inactive period, the second component requires resynchronization to the first component. For example, prior to the end of a vertical blanking interval, an LPDP source wakes the LPDP sink, and begins transmitting synchronization sequences on the main link. The synchronization sequence enables clock data recovery (CDR) lock and symbol lock prior to the active period. Once the second component has acquired symbol lock, the second component prepares to receive data via the primary link.

At step 208, the second component receives data via the primary link and resumes operation.

Exemplary Low Power DisplayPort Operation—

As used herein, the term "DisplayPort" refers without limitation to apparatus and technology compliant with "VESA DisplayPort Standard" specifications. At the time of filing, existing publications of the "VESA DisplayPort Standard" include, but are not limited to "VESA DisplayPort Standard"—Version 1, Revision 2 dated Jan. 5, 2010; "VESA DisplayPort Panel Connector Standard"—Version 1.1 dated Jan. 4, 2008; "VESA DisplayPort PHY Compliance Test Standard"—Version 1.1a dated Oct. 26, 2009; and/or "VESA DisplayPort Link Layer Compliance Test Standard"—Version 1.1 a dated Oct. 2, 2009, as well as so-called "Mini DisplayPort" technology described in the VESA DisplayPort Version 1, Revision 2 dated Jan. 5, 2010, each of the foregoing being incorporated herein by reference in its entirety, and any subsequent revisions thereof.

Various aspects of the present invention are directed to improved solutions for reducing power consumption requirements, and/or logic circuit requirements. As described in greater detail hereinafter, DisplayPort (DP) operation can be specialized for use on an embedded display. These collective modifications are referred to hereinafter as Low Power DisplayPort (LPDP) device and system configuration. Specifically, as described in greater detail herein, LPDP devices have been designed to support internal transfer of visual data between infra-device components within high density form factor designs.

Additionally, where possible the exemplary LPDP device and system configurations should support seamless operation with extant DP devices. For example, while LPDP devices may not be able to transmit legacy DisplayPort-compliant signaling, certain embodiments may enable receiver functionality with legacy DP devices. For example, a LPDP sink may be suitable for use as a DP sink only (i.e., disabled DP source capabilities). Similarly, for various manufacturing reasons, certain components which are commoditized are both less expensive and can be provided reliably from multiple sources.

Figure 3:
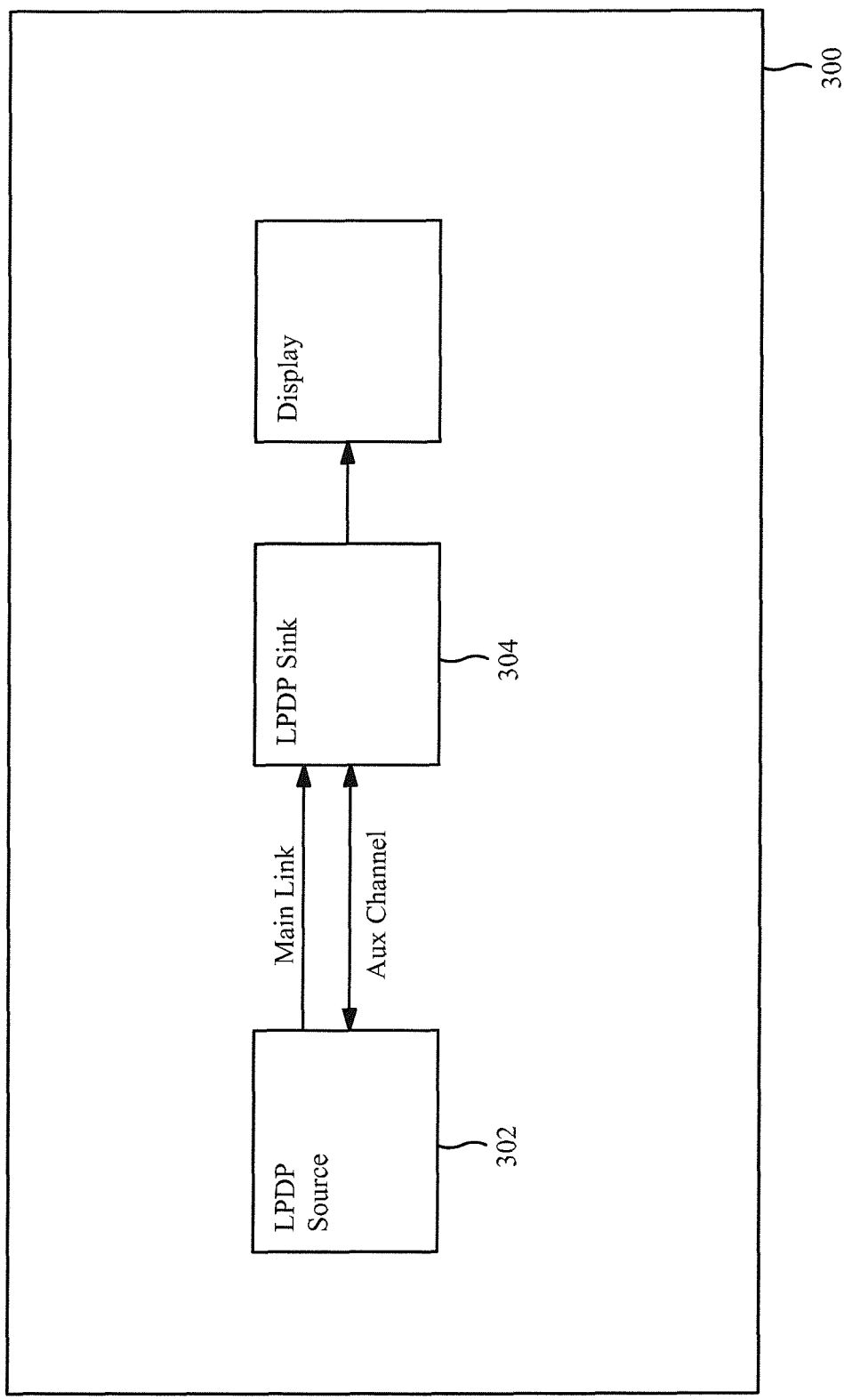
FIG. 3 is a block diagram illustrating one exemplary embodiment of an A/V (here, Low Power DisplayPort (LPDP)) device in accordance with various aspects of the present invention.

Referring now to FIG. 3, one exemplary LPDP device 300 includes a LPDP source 302 and a LPDP sink 304, where the source and sink are in very close proximity (in some cases, completely obviating transceivers, cable connectivity, etc.) The LPDP interface includes: (i) one or more (e.g., 1, 2, 4) main link differential pairs for transferring data (also commonly referred to as "lanes"), (ii) at least one auxiliary link differential pair for control signaling (also commonly referred to as "AUX"), (iii) power and ground. Additionally, the LPDP interface may additionally include connectivity for: reset, hot-plug detect (HPD), configuration, etc. Data is encoded with 8b10b encoding (i.e., each 8 bits of information are encoded with a 10 bit symbol) and packetized for transfer.

Common examples of devices which are suitable for LPDP operation, include but are not limited to, the iPhone™, iPod™, iPad™, etc. products manufactured by the Assignee hereof. In one such variant, the exemplary embodiment integrates a panel timing controller (TCON) and panel drivers into a single display driver component for mounting on the display panel (mounting on the "glass") (e.g., iPhone, iPod), or alternately, where space is less critical, a separate TCON and panel row-column driver can be implemented (e.g., iPad).

The exemplary LPDP device 300: (i) supports multiple data rates of 1.92 Gbps, 2.16 Gbps, 2.4 Gbps, 3.24 Gbps, and 4.32 Gbps in addition to legacy DP data rates (1.62 Gbps (also referred to as Reduced Bit Rate (RBR)), 2.7 Gbps (also referred to as High Bit Rate (HBR)), 5.4 Gbps); (ii) supports lower signaling voltages (200 mV to 500 mV differential, peak to peak); (iii) does not require legacy DP pre-emphasis for speeds up to 2.7 Gbps; (iv) does not require legacy DP equalization; (v) supports a modified AUX channel Manchester transactions between 1 Mbps to 12 Mbps; (vi) supports a Quiescent ("Quiet") Mode for the main link during the vertical blanking interval; (vii) supports WAKEUP and SLEEP code operation on the AUX channel for fast sleep and wakeup during the vertical blanking interval; (viii) supports a no-handshake Link Training sequence; (ix) supports alternate scrambler display authentication; and (x) supports Reduced Bit Rate (RBR) and High Bit Rate (HBR) operation. Furthermore, certain functionality previously implemented within legacy DP is not supported within LPDP. For example, High-Bandwidth Digital Content Protection (HDCP), and audio has been disabled.

Variants of LPDP device 300 may also (but not necessarily) support any of these additional features (i.e., legacy DP features): (i) Fast Link Training; (ii) No Link Training; (iii) Multi-stream operation; (iv) topology management, (v) High-Bandwidth Digital Content Protection (HDCP), and/or (vi) audio. In some embodiments, the LPDP device may further support a panel "self refresh", where the panel refreshes itself from a local frame buffer (allowing the DP link to be turned off).

It is appreciated that in alternate embodiments, different functionality may be enabled or disabled, such choices being entirely design dependent. It is appreciated that modification to support the various permutations and subsets of the described functionality are well within the skill of artisans in the related arts, given the contents of the present disclosure.

Referring now to TABLE 1, various functional distinctions between DP and LPDP are summarized. Additionally, TABLE 1 also summarizes various interoperability issues i.e., additional considerations which are relevant when connecting between DP and LPDP devices.

TABLE 1

|  | Difference | DisplayPort (DP) | LPDP | Interoperability |
|---|---|---|---|---|
| PHY | Driver | Current Mode | Voltage Mode or Mixed Mode | No Issue |
|  | Data Rate | 1.62/2.7/5.4 Gb/s | 1.62/1.92/2.4/ 2.7/3.42/4.32/5.4 Gb/s | DP rates are supported in LPDP, not all LPDP rates are supported in DP |
|  | Amplitude | 400/600/ 800/1200 mV | 200/ . . . /500 mV | 400 mV |
|  | Preemphasis (PE) Equalization (EQ) | Full Functionality | Reduced Functionality | No issue |
| LINK | TX | No difference | No difference | No issue |
|  | RX | No difference | Reduced functionality | No issue |
|  |  | Fixed pixel clock (PLL) | Pixel clock derived from link clock | No issue |
|  |  | Ext. EDID IC | No EDID, Panel ID | EDID shadowing in LPDP RX |
|  | Connection | Continuously On | Shutting down during Vertical Blanking | LPDP supports both modes |

Several salient differences between DP and LPDP are now described in greater detail.

Data Rate Adaptation/Selection—

As a brief aside, legacy DisplayPort (DP) supports only three (3) data rates for the main link for data transfer: 1.62 Gbps, 2.7 Gbps, 5.4 Gbps. Historically, DP supports only a limited number of data rates to simplify clock data recovery mechanisms, as well as to leverage existing solutions which are based on PCI-E (Peripheral Component Interconnect Express) interfaces. Unfortunately, having only a few supported data rates can be very power inefficient. In order to support a data stream which only marginally exceeds the capacity of a lower data rate, the DP interface must jump to the next highest data rate, and fill the excess capacity with "dummy" data. Dummy data consumes as much power as useful data; so, power consumption scales dramatically, for only marginally better performance. Thus, in typical DP devices, power consumption and efficiency are important but were considered less critical in view of the other aforementioned design considerations.

Accordingly, in one exemplary embodiment of the present invention, LPDP devices are configured to support many more data rates than DP. During operation, an LPDP source and sink is configured to adjust the data rate according to the display requirements. In one such embodiment, the data rate is determined by the screen or panel resolution. For example, each pixel on a screen is refreshed periodically (e.g., (1920×1080) pixels×60 times a second), thus the data rate depends on the number of pixels on the screen and rate of refresh. As screen resolutions improve (for example with so-called "retinal displays") higher bandwidth is needed, and this in turn requires more power. For example, very high resolution may require two (2) or four (4) lanes of data but not use the entire link capacity. Unfortunately, sending a large amount of dummy data over two or four lanes is very inefficient.

In these cases, the LPDP source determines a minimum data rate necessary to support the display panel. During transmission, the LPDP source and sink use at least the minimum data rate (higher data rates may be selected for other considerations (such as platform noise), however generally the lowest acceptable rate is preferred for power consumption reasons).

Additionally, LPDP devices may additionally support interoperation with legacy components i.e., while connected to a DP sink (or source), the LPDP device limits itself to supported DP data rates. In one exemplary embodiment, identification of LPDP devices, and/or data rate negotiation is handled via the AUX channel. In some embodiments, each lane may be individually programmable.

Furthermore, it is worth noting that the identified data rates are chosen as multiples of 27 MHz to maximize the ubiquity of 27 MHz crystals which are commonly used within industry. For systems where such manufacturing considerations are not as important or where particular frequencies, other data rates may be possible.

Another drawback to the limited data rates of legacy DP devices occurs when one or more of the data rates causes or experiences excessive platform noise. For example, if the internal construction of a DP device is such that electromagnetic interference (EMI) interferes with device operation at one of the few data rates (e.g., the DP link causes or experiences interference), the DP device can experience undesirable behavioral characteristics during operation. Due to the highly sensitive nature of the visual playback, such undesirable characteristics are easily noticed and detract significantly from user experience. With only a few data rates to choose from, legacy DP devices have had to choose between impacting user experience or avoiding operation with the impacted data rate. Aggressive form factor designs further exacerbate this effect, which has traditionally limited or severely affected consumer electronics.

Consequently, in another exemplary embodiment of the present invention, LPDP devices are configured to select data rates so as to minimize effects of platform noise. For example, during operation, an LPDP source and sink is configured to select from a subset of data rates which have been determined (either ahead of time, during operation, etc.) to maximize performance, minimize platform noise, and/or minimize radiated emissions. according to application requirements. Certain embodiments may select data rate based on a combination of such considerations. For instance in one exemplary embodiment, the transceiver is preprogrammed to avoid certain data rates (e.g., based on platform noise measurements conducted during manufacturing).

Similar to display panel resolution requirement based selection, LPDP devices that select data rate according to platform noise may opt to support interoperation with legacy DP components by limiting operation to legacy data rates.

Amplitude Adaptation/Selection—

Legacy DisplayPort (DP) operation must support driving an audio/visual (A/V) signal over cables; in some cases, over significant distances. For this reason, legacy DP operation has specified transceivers based on current mode operation, using differential signaling, and with signaling amplitudes of 400 mV, 600 mV, 800 mV, and 1200 mV. However, within high density form factor designs, such signaling is both unnecessary, and undesirable (from both power and emitted EMI noise considerations). Moreover, typical implementations of current mode logic (CML) are built from open-drain differential pairs and voltage-controlled current sources. The voltage-controlled current must vary the amount of current used to drive the output load (the output voltage swing is load dependent). While CML can drive different impedance loads, it requires substantial power consumption.

Consequently, in one embodiment, LPDP components are configured to use voltage mode, differential signaling at lower amplitudes. Voltage mode logic (VML) can be constructed from PMOS and NMOS voltage-controlled voltage sources that drive the output high and low voltages ($V_{OH}$, $V_{OL}$) of the driver, an output transistor swings between those values. The output swing of VML interfaces is independent of the load impedance. While VML type logic is poorly suited for DP (VML is poorly suited for cable transmission over appreciable distances), it readily suits the requirements of LPDP.

Additionally, LPDP components are further configured to operate from 200 mV to 500 mV, selectable to within 50 mV steps (e.g., 200 mV, 250 mV, 300 mV, etc.) In one such embodiment, the transceiver is programmed to select the minimum voltage swing necessary to transmit data. It is further appreciated, that the voltage swing may need to be programmed according to data rate, speed, amount of traffic, traffic requirements, etc. For example, while low data rates may accept lower voltage swings, higher data rates may require higher data swings. In some embodiments, each lane may be individually programmable. It is appreciated by those of ordinary skill in the related arts that, finer granularity transceiver settings can add complexity to the driver, but will offer diminishing returns for power savings. Consequently, while 50 mV is described with respect to LPDP, other systems (and future versions of LPDP) may have different increment steps.

Finally, LPDP components may additionally support interoperation with legacy components i.e., while connected to a DP sink (or source), the LPDP component limits itself to operation at 400 mV (400 mV is acceptable for legacy DP devices, LPDP supports up to 500 mV). In some cases, an external transceiver may be necessary to provide capabilities to drive longer distances, higher impedance loads, etc.

Pre-Emphasis (PE) Equalization (EQ) Link Training—

Legacy DisplayPort (DP) requires link initialization before transporting a stream, unless the source transmitter and the sink receiver are already in synchronization. During link initialization, the graphics processor (or source transmitter) controls link training and uses the AUX channel to communicate with the sink device, and configures the link with a desired set of link configuration parameters. Specifically, the source transmits test patterns without any pre-emphasis and the receiver disables equalization. Based on the transmitted test patterns, the receiver can determine if channel equalization is necessary. Similarly, the receiver can request pre-emphasis at the transmitter if necessary. Successful completion of the foregoing process is necessary to ensure that the DP transmitter can accurately and robustly drive the attached DP receivers. Generally, pre-emphasis and equalization link training must be performed in the event of a loss of clock recovery lock, loss of a symbol lock, loss of an inter-alignment lock, etc.

However, in order to minimize power, neither transmitter pre-emphasis nor receiver equalization is required to be implemented by LPDP components. In particular, since the LPDP is limited to connections between infra-device components within high density form factor designs, transmission line characteristics remain within acceptable limits up to certain threshold data rates.

In some variants, pre-emphasis and equalization training link initialization can be skipped entirely because the device has "predetermined" a loss on the transmission line (e.g., where the internal LPDP bus is a fixed connection). Specifically, unlike Legacy DP which must support different lengths of cables, LPDP interfaces that are limited for internal connections (such as the aforementioned iPhone, iPad, etc.) can be optimized at manufacture. The PE/EQ can be hard-coded into the source and sink components rather than initializing the link each time i.e., the PE/EQ link analysis has been performed ahead of time. Moreover, in certain variants these features may be selectively enabled/disabled; for example, in an iPhone pre-emphasis may be disabled to reduce overall EMI, however, equalization may still be enabled depending on considerations such as power consumption and channel loss.

In one exemplary LPDP device, pre-emphasis and equalization link training are not performed for data rates below 2.7 Gbps. Data rates above 2.7 Gbps require pre-emphasis and equalization link training. It is further appreciated that the 2.7 Gbps is implementation specific (i.e., longer cable distances may require a lower threshold, whereas non-cabled embodiments may have no threshold, etc.)

In some embodiments, the device may incorporate passive (low power) fixed de-emphasis (e.g., a resistor capacitor circuit (RC), etc.). Alternately, a transmitter may optionally support active pre-emphasis. In some embodiments pre-emphasis levels may be implemented as part of the system design; alternately, pre-emphasis parameters are set by the source driver for one or more of the output swing levels.

"Quiescent (Quiet) Mode" Link Operation—

Extant solutions for DisplayPort (DP) do not support intermittent link connectivity. Once a source has been connected to a sink via a cable, the connection is maintained until the cable is disconnected (i.e., disconnecting the connection cable asserts the hot-plug detect (HPD) signal). Unfortunately, those of ordinary skill in the related arts will recognize that during media transfer, data transfer is not active during significant portions of time (e.g., vertical blanking interval). Accordingly, various aspects of the present invention are directed to putting the main link into an inactive state to reduce power consumption.

Figure 4:
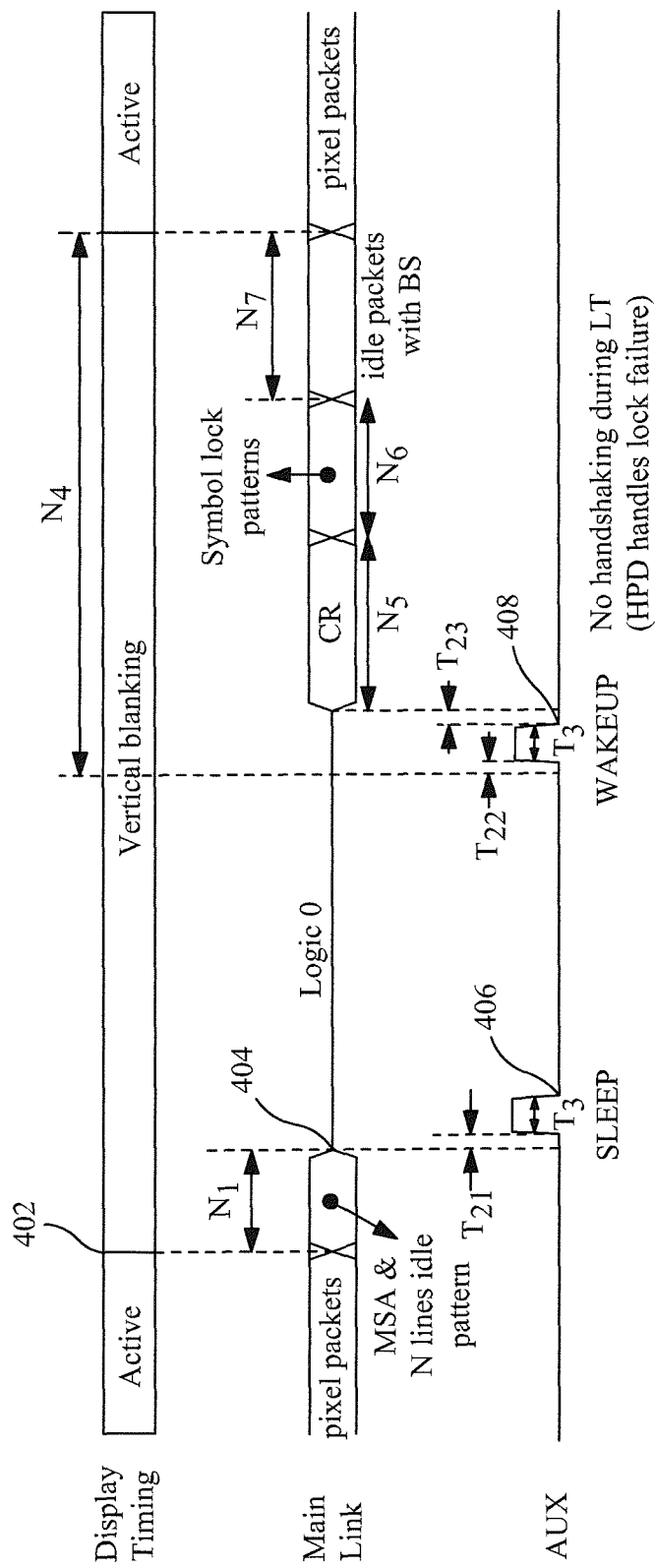
FIG. 4 is a graphical illustration of an exemplary Low Power DisplayPort (LPDP) sleep and wakeup procedure in accordance with one aspect of the present invention.

One exemplary sleep and wakeup sequence is illustrated in FIG. 4. As shown, the display operation is split into active and vertical blanking modes. During the vertical blanking interval, no data is transmitted over the main link; during these periods of inactivity, the main link can be put into a quiet mode. Quiet mode operation is controlled by the source component via control signaling that is performed over the AUX channel. Other implementations may explicitly or implicitly control such operation via other signaling methods, pre-defined protocols, according to schedule, etc.

Referring back to FIG. 4, at time 402, the source ends data transmission on the main link. At time 404, the sink finishes powering down the display. At time 406, the source transmits a sleep indication on the AUX channel. The sink enters sleep mode and shuts down the main link; the AUX channel remains active.

Shortly before ending the vertical blanking interval, the source transmits a wakeup indication to the sink over the AUX channel (time 408), and begins transmitting on the main link. The wakeup indication initiates a so-called "no-handshake link training sequence" to allow the sink to complete clock data recovery (CDR) lock and symbol lock after the wakeup event. A failure in the no-handshake link training is handled by asserting an HPD signal (e.g., hot plug detect interrupt request (HPD IRQ)). The transmission of the wakeup indication is configured to allow the sink enough time to resynchronize to the main link. In one exemplary embodiment, this includes an amount of time suitable for the sink to achieve clock data recovery lock, an amount of time suitable for the sink to determine receive symbol lock, and an amount of time during which the sink is monitoring for blanking start (BS) symbols. BS is specified to be transmitted by the source after the last active pixel during the active period, and inserted at the same symbol time during the vertical blanking interval as during the active period. Once the sink has received the idle packets with BS for the main link, the active mode can begin.

If the foregoing process does not complete successfully, the HPD IRQ signal is asserted, and the source and sink can initiate legacy connection (e.g., link training procedures, etc.) or alternately disconnection procedures (e.g., power saving mode, etc.)

In one exemplary embodiment, the AUX channel of the source transmits sleep and wakeup codes to indicate the fast sleep and wake for sink. In one such variant, sleep and wakeup codes are defined as unique patterns that violate legacy Manchester-II encoding that is implemented within the AUX channel. The unique patterns are both distinctive and simple, so as to assist in minimizing the complexity of circuitry necessary to interpret the sleep and wakeup codes. Other schemes can be used (e.g., where circuitry complexity is not a driving constraint, or where Manchester-II encoding cannot be violated, etc.)

"Hot-Plug" Detection—

In another aspect of the present invention, extant solutions for DisplayPort (DP) interfaces implement a distinct signaling interface for hot-plug detection (HPD). While legacy solutions for HPD via a dedicated pin for signaling, such dedicated pin signaling is undesirable for very high density form factor designs. Consequently, implementation of HPD signaling without requiring a dedicated pin is highly desirable. Specifically, in one exemplary embodiment, data can be extracted via traditional differential signaling (e.g., the difference between the voltages associated with positive and negative differential pair terminals), and additionally by utilizing the DC isolated segment of the differential lines independently or as a common mode signal (e.g., the average of the voltages associated with positive and negative differential pair terminals i.e., the offset from 0V).

Figure 5:
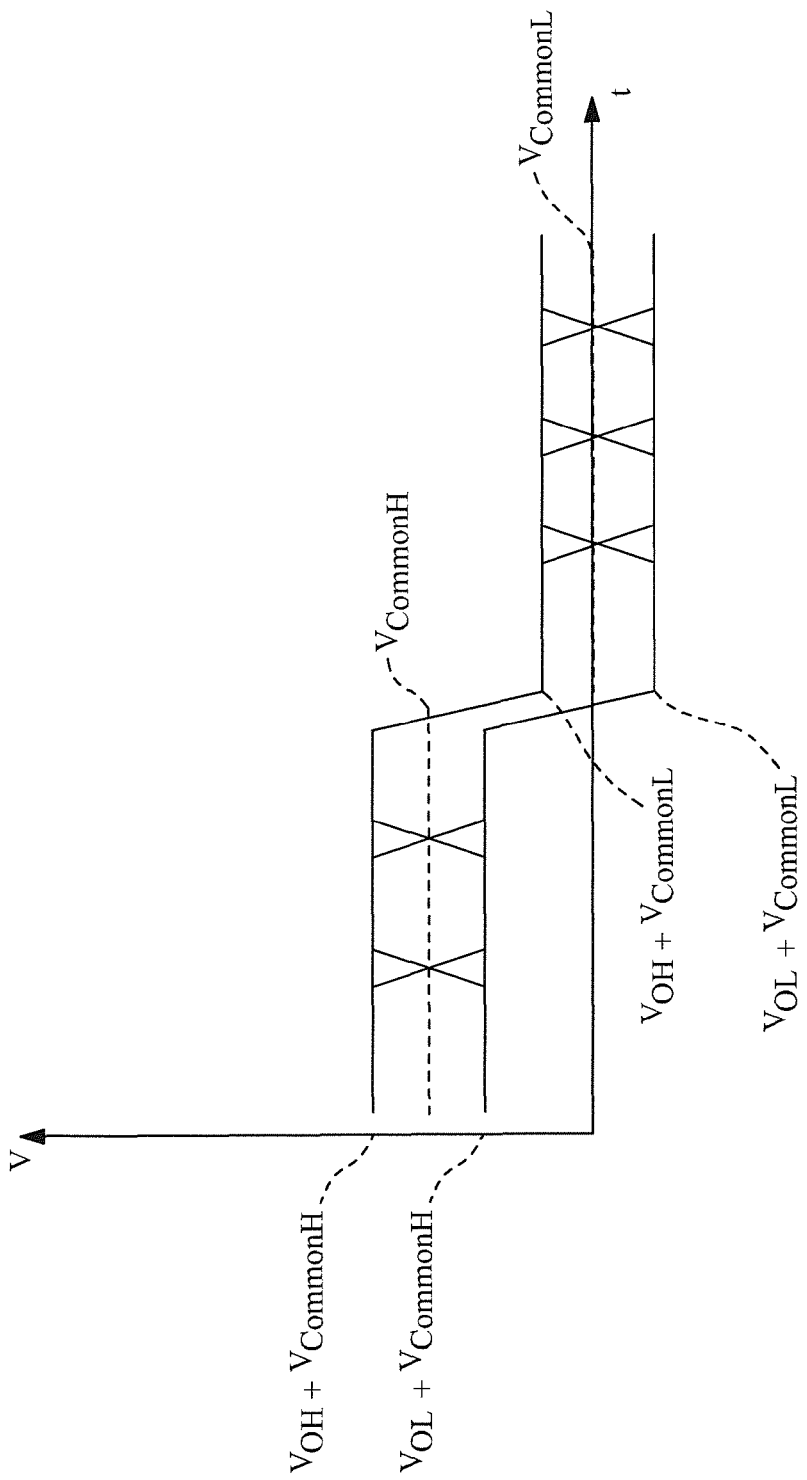
FIG. 5 is a graphical illustration of an exemplary scheme for overloading a differential signaling pair with a common mode voltage signaling in accordance with one aspect of the present invention.

Referring now to FIG. 5, the sink component has overloaded the AUX channel so that the common mode voltage, or the individual voltages, of the DC isolated segments of the differential pair can be used to indicate a hot plug voltage.

Moreover, artisans of ordinary skill in the related arts will recognize that common mode voltage on a differential pair does not affect the differential signaling. Accordingly, HPD signaling can be implemented without affecting the concurrent AUX channel signaling for either the sink or the source component.

Apparatus—

Figure 6:
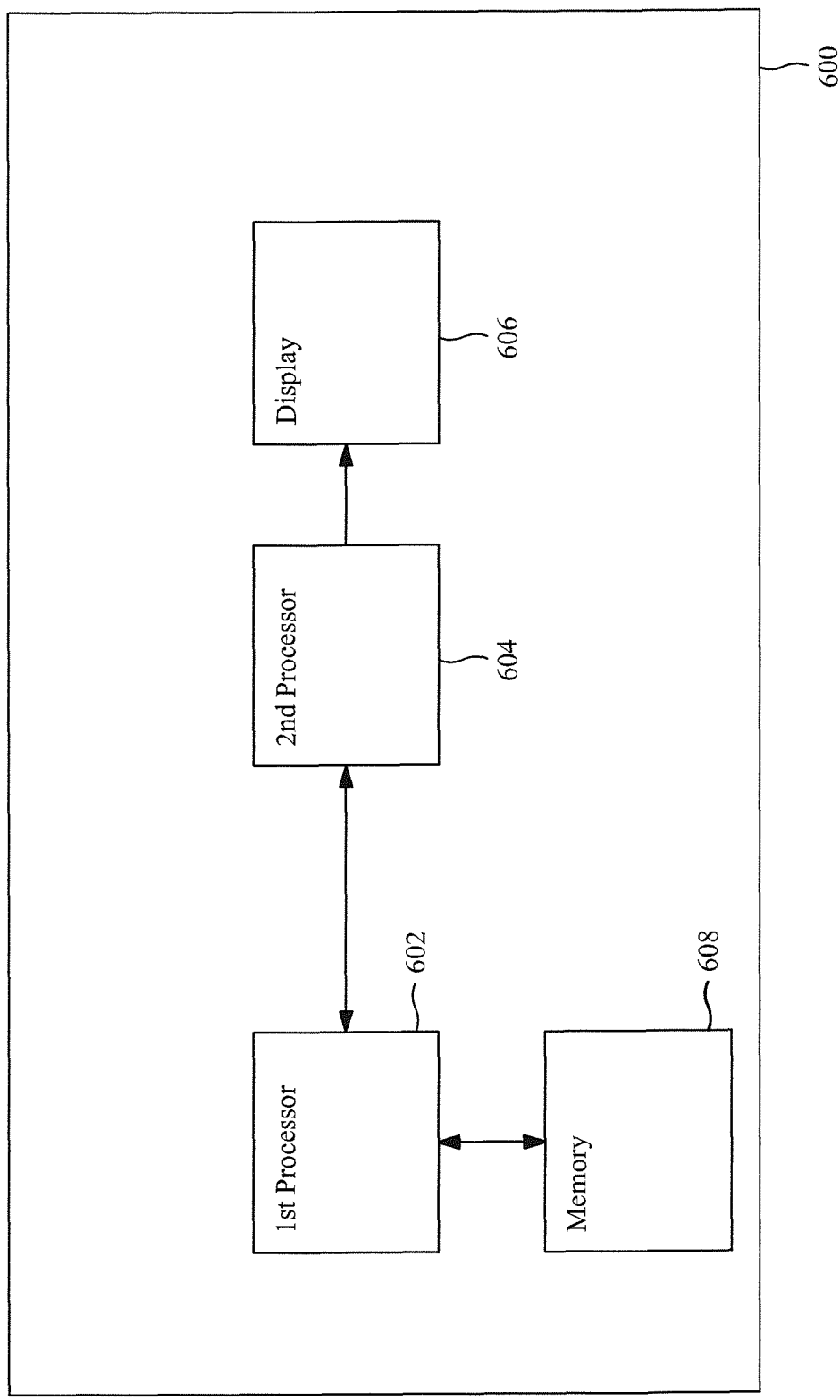
FIG. 6 is a block diagram of one embodiment of a device configured to adjust operation of at least a first component and second component according to prescribed (e.g., high density form factor) constraints in accordance with various aspects of the present invention.

Referring now to FIG. 6, an exemplary user device apparatus 600 implementing the Low Power DisplayPort solution is illustrated. As used herein, the term "user device" includes, but is not limited to cellular telephones, smart phones (such as for example an iPhone™), personal computers (PCs), such as for example Macbook™, Macbook Pro™ Macbook Air™, and minicomputers, whether desktop, laptop, or otherwise, as well as mobile devices such as handheld computers, PDAs, video cameras, set-top boxes, personal media devices (PMDs), such as for example an iPod™, iPad™, display devices (e.g., those compliant with the aforementioned DisplayPort standard(s)), or any combinations of the foregoing. While a specific device configuration and layout is shown and discussed, it is recognized that many other implementations may be readily implemented by one of ordinary skill given the present disclosure, the apparatus 600 of FIG. 6 being merely illustrative of the broader principles of the invention.

The illustrated apparatus 600 of FIG. 6 includes a first processor 602, a second processor 604, and a display element 606, embedded within a very high density form factor design. In one exemplary embodiment, the first and second processors (602, 604) includes one or more of central processing units (CPU) or digital processors, such as a microprocessor, digital signal processor, field-programmable gate array, RISC core, or plurality of processing components mounted on one or more substrates.

The first processor is coupled to operational memory 608, which may include for example SRAM, FLASH, SDRAM, and/or HDD (Hard Disk Drive) components. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

The second processor is coupled to the display element 606. Common examples of display elements include but are not limited to: Liquid Crystal Display (LCD), Light Emitting Diode (LED), Electroluminescent display (ELD), Cathode ray tube (CRT), Plasma Display Panel (PDP), Liquid Crystal on Silicon (LCoS), etc. More exotic display elements include for example: Organic light-emitting diode (OLED), Organic light-emitting transistor (OLET), Surface-conduction electron-emitter display (SED), Field emission display (FED), etc.

In one exemplary embodiment, the first processor 602 includes a Low Power DisplayPort (LPDP) source 602, and the second processor 604 includes a Low Power DisplayPort (LPDP) sink 604. The LPDP source is further adapted to transmit one or more media streams to the LPDP sink for display via the display element. In one exemplary embodiment, the LPDP source and sink are connected via signal trace, short cable, etc. The LPDP interface generally includes (i) one or more (e.g., 1, 2, 4) main link differential pairs for transferring data, (ii) at least one auxiliary link differential pair for control signaling, (iii) power and ground. In some variants, the LPDP interface may additionally include connectivity for: reset, hot-plug detect (HPD), configuration, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method comprising:
operating a communication link between a first component and a second component, wherein the communication link includes a data portion and a control portion;
sending data to the second component via the data portion during an active period, and transmitting no data via the data portion during an inactive period that is subsequent to the active period;
sending a sleep indication to the second component subsequent to a start of the inactive period via the data portion;
the second component disabling the data portion of the link and entering a sleep mode in response to the sleep indication;
the first component sending, prior to an end of the inactive period, a wake indication to the second component via the control portion of the link;
the first component sending data to the second component via the data portion of the link subsequent to sending the wake indication;
wherein the data sent subsequent to the wake indication is sufficient to allow the second component to achieve synchronization with the data portion of the link.

2. The method of claim 1, wherein the inactive period corresponds to a vertical blanking interval.

3. The method of claim 1, wherein the first component comprises a source device and the second component comprises a sink device, wherein both the source device and the sink device are compliant with the Video Electronics Standards Association (VESA) DisplayPort standard specification version 1, revision 2.

4. The method of claim 1, wherein the wake indication comprises a unique pattern.

5. The method of claim 1, wherein the data subsequent to the wake indication comprises one or more symbol lock patterns followed by idle packets including a blanking start symbol.

6. The method of claim 1, further comprising the second component powering down a receiver coupled to the data portion of the communication link.

7. The method of claim 1, further comprising the second component completing clock data recovery without a handshake with the first component.

8. The method of claim 7, further comprising the sink device asserting a hot plug indication on the control portion of the communication link in response to a failure to synchronize.

9. The method of claim 8, wherein asserting a hot plug indication includes the sink device sending an amount of data on the control portion sufficient to allow the source device to extract a common mode voltage that is detected as the hot plug indication.

10. A system comprising:
a source device;
a sink device coupled to the source device via a communication link including a data portion and a control portion;
wherein the source device is configured to alternatingly send data to the second component via the data portion during an active period, and to transmit no data via the data portion during an inactive period;

wherein the source device is configured to send a sleep indication to the sink device subsequent to a start of the inactive period via the data portion;

wherein in response to the sleep indication the sink device is configured to disable the data portion of the link and enter a sleep mode;

wherein the source device is further configured to send, prior to an end of the inactive period, a wake indication to the sink device via the control portion of the link;

wherein the source device is further configured to send data to the sink device via the data portion of the link subsequent to sending the wake indication;

wherein the data subsequent to the wake indication is sufficient to allow the sink device to achieve synchronization with the data portion of the link.

11. The system of claim 10, wherein the inactive period corresponds to a vertical blanking interval.

12. The system of claim 10, wherein both the source device and the sink device are compliant with the Video Electronics Standards Association (VESA) DisplayPort standard specification version 1, revision 2.

13. The system of claim 10, wherein the wake indication comprises a unique pattern.

14. The system of claim 10, wherein the data subsequent to the wake indication comprises one or more symbol lock patterns followed by idle packets including a blanking start symbol.

15. The system of claim 14, wherein the sink device is configured to complete clock data recovery during reception of the symbol lock patterns and the idle packets without a handshake with the source device.

16. The system of claim 10, wherein the sink device is configured to assert a hot plug indication on the control portion of the communication link in response to a failure to synchronize.

17. The system of claim 16, wherein the sink device is configured to send an amount of data on the control portion sufficient to allow the source device to extract a common mode voltage to detect that common mode voltage as the hot plug indication.

18. The system of claim 10, wherein the sink device includes a receiver coupled to the data portion of the communication link, wherein the receiver is configured to power down in response to receiving the sleep indication.

* * * * *